United States Patent

Asinger et al.

[15] 3,700,683
[45] Oct. 24, 1972

[54] PROCESS OF MAKING THIAZOLINES-3

[72] Inventors: Friedrich Asinger, Aachen; Heribert Offermanns, Grossauheim; Mikols Ghyczy, Laurensberg, all of Germany

[73] Assignee: Deutsche Gold- Und Silber-Scheideanstalt Vormals Roessler, Frankfurt am Main, Germany

[22] Filed: Sept. 4, 1969

[21] Appl. No.: 855,417

[30] Foreign Application Priority Data

Sept. 6, 1968   Germany..........P 17 95 299.7

[52] U.S. Cl.................................................260/306.7
[51] Int. Cl. .............................................C07d 91/24
[58] Field of Search..................................260/306.7

[56] References Cited

OTHER PUBLICATIONS

Asinger et al., Angew. Chem., Int. Ed. Engl., 6(11) 907– 19 (1967).
Cason, Organic Chemistry, Prentice–Hall, N.J., pp. 36– 7, 1956.

Primary Examiner—Alex Mazel
Assistant Examiner—R. J. Gallagher
Attorney—Michael S. Striker

[57] ABSTRACT

2,5,5-substituted thiazolines-$\Delta^3$ of the formula

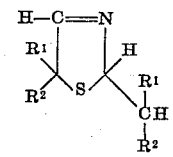

(I)

in which $R^1$ and $R^2$ are alkyl and may be the same or different, alkyl having one to four carbon atoms are made by reacting an aldehyde of the formula

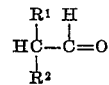

(II)

wherein R has the same meaning as above, with sulfur and ammonia or an ammonium or sulfur compound in the presence of a secondary or tertiary amine while azeotropically removing the reaction water.

The process results in very high yields.

11 Claims, No Drawings

PROCESS OF MAKING THIAZOLINES-3

BACKGROUND OF THE INVENTION 2,5,5-trialkyl-substituted thiazolines- $\Delta^3$ have been obtained by reacting alkylidene vinylamines with elementary sulfur at temperatures between 100° and 150° C. In this process an aldehyde was used that was branched at the α-C-atom, and alkylidenevinylamine was formed in the first stage of the reaction. The reaction water was gradually removed by slow heating.

However, this process has the shortcoming that the reaction results in more or less large amounts of by-products (German published application 1,063,602). Tests with this process have shown that the maximum yield is about 30%.

It has also been proposed to react ketones which in the α-position relative to the carbonyl group have at least one hydrogen atom with sulfur and ammonia in order to form the corresponding substituted thiazolines-$\Delta^3$, see the Annual Report for 1967 of Landesamt fur Forrchung des Landes Nordrhein-westfalen, pp. 11–35. However, as indicated in this publication, the yield was not in excess of 10% if, instead of the ketone, an aldehyde was used.

It is therefore an object of the invention to obtain 2,5,5-substituted thiazolines-$\Delta^3$ in satisfactory yields, starting from readily available starting compounds.

SUMMARY OF THE INVENTION

The process of the invention involves making 2,5,5-substituted thiazolines-$\Delta^3$ of the formula

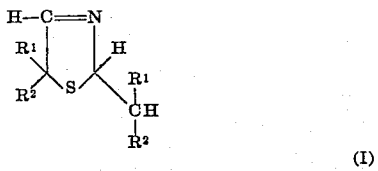

(I)

wherein $R^1$ and $R^2$ are lower alkyl having one to four carbon atoms and may be the same or different by reacting an aldehyde of the formula

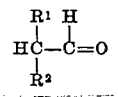

wherein R has the same meaning as above with sulfur or a sulfur-containing compound or ammonia or an ammonia-containing compound in the presence of a secondary or tertiary amine while azeotropically removing the reaction water.

DESCRIPTION OF THE PREFERRED EMBODIMENTS

The process of the invention results in high yields. The yields usually are about 80 but can be further improved by providing that no aldehyde escapes together with the ammonia from the reaction vessel. This can for instance be accomplished by washing or freezing the aldehyde found in the exhaust gas and recirculating it or also by employing a pressure slightly above atmospheric. The formation of by-products is, in any case, nil.

Instead of ammonia, it is possible also to use $NH_4NO_3 \cdot NH_3$.

Preferably, the process is carried out by heating a mixture of preferably stoichiometric amounts of aldehyde, sulfur and ammonia, or compounds of sulfur and ammonia, in the presence of a flushing agent for the reaction water and in the further presence of an amine. The heating is continued for about 2 to 3 hours, while the reaction water is gradually removed by azeotropic distillation. The temperature should generally be between about 50° and 100° C. After completion of the reaction the flushing agent, the ammonia, and possibly the amine are withdrawn at a reduced pressure and can be reused. The thiazoline-$\Delta^3$ can be purified by rectification upon exclusion of air. If a solid amine is used, it must be washed out of the reaction product with a dilute acid. The flushing agent for the reaction water may for instance be benzene, toluene, xylene, cyclohexane, chlorinated hydrocarbons such as chloroform or methylene and the aldehyde itself may also be used as flushing agent.

The secondary and tertiary amines may in particular be those having boiling points between about 40° and 150° C. Examples are the trialkylamines such as triethylamine, pyridine, piperidine, pyrrolidine and its N-substitution derivatives such as N-methylpyrrolidine and diazadicyclooctane. The preferred amine is pyridine.

It is preferred to use an amount of amine between about 0.1 and about 0.5 mol per mol of aldehyde. The amount of amine is not critical.

The preferred aldehydes are 2-methylvaleraldehyde and particularly isobutyraldehyde.

As indicated the process may be carried out in the presence of elementary sulfur. However, other sulfur-containing compounds may be used such as polysulfides or compounds of the type of 7-phenyl-7-alkyl-amino-8-thioxo-1,2,3,4,5,6,-hexathiocanes.

Preferably, the two organic substitutents in the aldehyde are alkyl having from one to four carbon atoms and specifically methyl. Accordingly, these organic groups will then be found in the final product.

The thiazolines-$\Delta^3$ are valuable intermediates for other syntheses. For instance, they may be used as the starting compounds for making α-amino-β-mercaptocarboxylic acids, particularly penicillamine, as disclosed in an application filed concurrently herewith. They are furthermore valuable oxidation inhibitors for polyolefins.

The following examples will further illustrate the invention.

EXAMPLE I

A mixture of 744 g (2 mol) of isobutyraldehyde, 0.8 mol triethylamine, 32 g (1 gram atom) of elemental sulfur and 120 ml benzene was heated for about 2½ to 3 hours while introducing ammonia (about 1.2 mol) and gradually removing the reaction water by azeotropic distillation. There were obtained 40 ml of reaction water which contained ammonia dissolved therein.

The benzene and the amine were removed at a slightly reduced pressure, and the 2-isopropyl-5,5-dimethylthiazoline-$\Delta^3$ was obtained by rectification. The yield was 70% of the theoretical yield. The boiling point was 60° C at Torr. $n_D^{20} = 1.4782$; picrate melting point 116° C.

EXAMPLE 2

The same process was used as in Example 1, but the amine was 1 mol pyridine. The yield of 2-isopropyl-5,5-dimethylthiazoline-$\Delta^3$ was 80% of the theoretical yield.

EXAMPLE 3

The process was again the same as in Example 1 but as the amine there was employed 0.7 mol piperidine. The yield in this case was 75% of the theoretical yield.

EXAMPLE 4

The process was the same as in Example 1 but instead of elementary sulfur there was used 1.1 mol of 7-phenyl-7-alkyl-amino-8-thioxo-1,2,3,4,5,6,-hexathiocane. The yield was 65% of the theoretical yield.

EXAMPLE 5

The process was again carried out as described in Example 1, but instead of ammonia there was used 0.6 mol of $NH_4NO_3 \cdot 2NH_3$. The yield was 60% of the theoretical yield.

EXAMPLE 6

The same process was used as described in Example 1 but 0.45 mol of triethylamine were used as the amine. The aldehyde itself was used as the flushing agent. The yield was 70% of the theoretical yield.

EXAMPLE 7

Again the same method was employed as described in Example 1 but 0.1 mol of pyridine was used as the amine and the aldehyde itself was used as the flushing agent. The yield 68% 68% of the theoretical yield.

We claim:

1. Process of preparing thiazolines-$\Delta^3$ of the formula

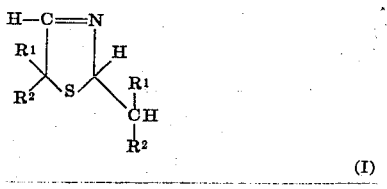

wherein $R^1$ and $R^2$ are each lower alkyl having from one to four carbon atoms comprising the steps of reacting an aldehyde of the formula

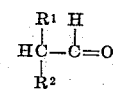

wherein $R^1$ and $R^2$ have the same meaning as above with about stoichiometric amounts of (a) ammonia or $NH_4NO_3 \cdot NH_3$ and (b) sulfur or was 68% that develops sulfur under the conditions of reaction, the said compound being selected from the group consisting of polysulfides and 7-phenyl-7-alkyl-amino-8-thioxo-1,2,3,4,5,6-hexathiocane, the reaction being carried out at a temperature of about 50° to 100° C in the presence of (c) a secondary or tertiary amine having a boiling point between about 40° and 150° C, and of (d) a flushing agent for the reaction water; removing the water formed in the reaction and the flushing agent by distillation and recovering the $\Delta^3$-thiazoline.

2. The process of claim 1, wherein an azeotropic mixture is removed of the water of the reaction, the flushing agent, and excess ammonia.

3. The process of claim 1, wherein $R^1$ or $R^2$ or both are methyl.

4. The process of claim 1, wherein the sulfur-containing compound is a polysulfide.

5. The process of claim 1, wherein the sulfur-containing compound is 7-phenyl-7-alkyl-amino-8-thioxo-1,2,3,4,5,6-hexathiocane.

6. The process of claim 1, wherein the amine is used in an amount from 0.1 to 0.5 mol per mol of aldehyde.

7. The process of claim 1, wherein the aldehyde is i-butyraldehyde.

8. The process of claim 1, wherein the amine is pyridine.

9. The process of claim 1, wherein escape of the aldehyde together with the ammonia is blocked during the reaction.

10. The process of claim 9, wherein escape of the aldehyde during the reaction is prevented by carrying out the reaction at a pressure above atmospheric.

11. The process of claim 1, wherein the flushing agent for the reaction water is benzene, toluene, xylene, cyclohexane or a chlorinated hydrocarbon or the aldehyde employed as starting compound.

* * * * *

UNITED STATES PATENT OFFICE
CERTIFICATE OF CORRECTION

Patent No. 3,700,683          Dated October 24, 1972

Inventor(s) Friedrich Asinger et al.

It is certified that error appears in the above-identified patent and that said Letters Patent are hereby corrected as shown below:

Column 3, Example 7, line 4 cancel the second "68%".

Column 4, line 10, cancel "was 68%" and insert

-- a compound --.

Signed and sealed this 18th day of June 1974.

(SEAL)
Attest:

EDWARD M. FLETCHER, JR.　　　　　　C. MARSHALL DANN
Attesting Officer　　　　　　　　　　Commissioner of Patents

UNITED STATES PATENT OFFICE
CERTIFICATE OF CORRECTION

Patent No. 3,700,683    Dated October 24, 1972

Inventor(s) Friedrich ASINGER, Heribert OFFERMANNS and Miklos GHYCZY

It is certified that error appears in the above-identified patent and that said Letters Patent are hereby corrected as shown below:

Col. 2 line 55 change "744" to "144"

Col. 2 line 67 after "at" insert "9"

Col. 3 line 35 change "68%" first occurrence to "was"

Col. 4 line 10 change "was 68%" to "a compound"

Signed and Sealed this

Seventeenth Day of October 1978

[SEAL]

Attest:

RUTH C. MASON
Attesting Officer

DONALD W. BANNER
Commissioner of Patents and Trademark